UNITED STATES PATENT OFFICE 2,032,457

PROCESS OF CONCENTRATING SULPHURIC ACID

Marshall F. Acken, Woodbury, N. J., assignor to E. I. du Pont de Nemours & Company, Wilmington, Del., a corporation of Delaware No Drawing. Application December 9, 1932, Serial No. 646,495

4 Claims. (Cl. 23—170)

This invention relates to the concentration of sulphuric acid and more particularly to the production of fuming sulphuric acid by means of a dehydrating agent and heat.

The commercial methods of concentrating sulphuric acid in practical use comprise the heating of the acid in such a manner as to remove the excess water. Since sulphuric acid is itself a dehydrating agent, the removal of this water is not easy, particularly as the concentration of the acid increases. Various methods of heating the acid have been used in the prior art. For example, a common method of concentration of sulphuric acid has been to pass hot gases over the surface of the acid. Other methods have comprised the indirect use of superheated steam as a concentration means, the direct application of flame beneath the sulphuric acid, etc. In carrying out the concentration of sulphuric acid by any of the above methods, various materials have been used, in which to carry out the concentration, the choice being influenced by the resistance of the material to corrosion by the hot sulphuric acid. The materials used have included lead, platinum, glass, iron, etc.

The concentration of sulphuric acid to a strength of approximately 93% is not difficult, provided an apparatus is used which is not attacked by the hot acid. Concentration beyond 93 to 96%, however, has been attended with many difficulties because of the fact that beyond this concentration the vapor pressure of the acid becomes appreciable. Even greater difficulties are met in the production of fuming acid, where it is necessary to split off the combined water.

The object of my invention is to provide an improved process for the concentration of sulphuric acid by means of a dehydrating agent. A further object is a process in which fuming sulphuric acid can be produced from the ordinary concentrated acid by further dehydration. Further objects will appear hereinafter.

I have found that an improvement in the dehydration of sulphuric acid and the production of fuming acid may be accomplished provided sulphuric acid of relatively high strength is distilled with phosphoric acid which is at least partially dehydrated. Under these conditions, the phosphoric acid becomes a sufficiently good dehydrating agent to remove all of the excess water from the sulphuric acid and part of the combined water. The first portion of the distillate will then consist of sulphuric acid containing an excess of sulphur trioxide. As the distillation progresses, the temperature rises until the point is reached where the phosphoric acid is no longer able to retain the water previously removed from the sulphuric acid. This water then begins to distill over with any sulphuric acid remaining in the distillation mixture. Consequently, the last portion of the distillate consists of comparatively weak sulphuric acid. The distillation is continued until all the sulphuric acid has distilled over and the phosphoric acid has reached its initial stage of dehydration. Proceeding in the manner described above, the maximum temperature of the distillation may be approximately 520° C.

While the foregoing procedure is accompanied by marked advantages, the high temperature reached during operation increases the corrosive action of the acid mixture on the materials of construction in contact with the hot liquids.

For this reason, I may bring about a further improvement in the process by carrying out at least a portion of the distillation under reduced pressure, since the temperature of the operation is thereby lowered and the effects of corrosion reduced. While the entire process may be carried out under reduced pressure, I find it advantageous to start the distillation under atmospheric pressure and to continue it under such pressure until the greater part of the sulphuric acid has distilled. The pressure may then be reduced, for example, to approximately 15 mm., at which pressure the remainder of the distillation is carried out. Operating under this reduced pressure, I find that a maximum temperature of 380° C. is sufficient. It is preferred that temperatures of 400° C. be not exceeded.

In the concentration of sulphuric acid by use of phosphoric acid as a dehydrating agent according to the method described, it is necessary that the phosphoric acid used be at least partially dehydrated previous to its introduction to the process. The dehydration of ortho-phosphoric acid proceeds, through the pyro-phosphoric acid, to the finally dehydrated meta-phosphoric acid, most probably according to the following reaction:

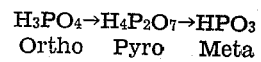

Ortho    Pyro    Meta

The dehydration of phosphoric acid is not carried to the extent that the acid is entirely in the meta form, since extremely high temperatures would be required for this purpose, with excessive corrosive action on the container materials. Furthermore, meta-phosphoric acid in completely dehydrated condition forms a solid mass which would make intimate mixture with the sulphuric acid very difficult. For this reason, I prefer to dehydrate the phosphoric acid only partially, so that the acid remains in a liquid condition, which permits intimate mixture with the sulphuric acid to be concentrated. The proper degree of dehydration has been found to be obtained when the ortho-phosphoric acid is dehydrated under atmospheric pressure at about 520° C., or under a 15 mm. pressure at approximately 380° C.

While the distillation of sulphuric acid and phosphoric acid has given fractions containing higher than 115% acidity, when calculated as $H_2SO_4$, a convenient method of expressing the yields of fuming acid is in terms of 104.5% $H_2SO_4$. The yield of fuming acid depends on the ratio of phosphoric to sulphuric acid in the mixture as shown below:

| Ratio $\frac{H_4P_2O_7}{H_2SO_4}$ | % recovery as 104.5% $H_2SO_4$ |
|---|---|
| 0.56 | 38.5 |
| 1.38 | 72.0 |
| 2.75 | 85.0 |

The following will serve to more specifically illustrate a method of carrying out my invention at atmospheric pressure in accordance with the foregoing description:

350 lbs. of ortho-phosphoric acid of a strength of 83.7% is dehydrated by heating to approximately 520° C. To the partially dehydrated acid thus obtained, 100 lbs. of 96% $H_2SO_4$ are added. The mixture of sulphuric acid and dehydrating agent is then distilled. In using such a procedure, approximately 85% of the sulphuric acid originally present may be recovered as fuming sulphuric acid of 104.5% concentration. The distillation mixture is finally heated to a maximum temperature of 520° C., at which temperature the distillation mixture is free from sulphuric acid and the phosphoric acid remaining in the still is in its initial state of dehydration. The sulphuric acid obtained in the latter part of the above distillation is low in strength, and may subsequently be concentrated by this same process.

While sulphuric acid may be concentrated as described above under atmospheric pressure, lower temperatures are sufficient if the process is carried out under reduced pressure, as the following example will show:

280 lbs. of ortho-phosphoric acid are dehydrated by heating to 380° C. under a pressure of 15 mm. To this dehydration agent, 100 lbs. of 96% $H_2SO_4$ are added and the mixture is distilled under atmospheric pressure until a temperature of 380° C. is reached. At this point the pressure in the distillation system is reduced to 15 mm. and the distillation is continued until the temperature again reaches 380° C. At this point no sulphuric acid is present in the distillation mixture and the phosphoric acid has become dehydrated to the required degree. Operating as described, approximately 63% of the original sulphuric acid is obtained as 104.5% $H_2SO_4$, while the remaining sulphuric acid consists of 84.5% $H_2SO_4$.

Using a procedure similar to the foregoing, the process may be carried out on a plant scale substantially as follows: Ortho-phosphoric acid is placed in a suitable still or equivalent apparatus and dehydrated at a temperature not exceeding 400° C., operating under reduced pressure. About one-third its weight of 93% $H_2SO_4$ is then added and the mixture subjected to distillation. If it is desired to produce 104.5% $H_2SO_4$, the fraction of the distillate containing acid of this strength can be removed at the proper time and the distillation continued until the next fraction has reached a concentration of 93%. This fraction can then be used in the next batch to be run through the still. The distillation is continued until the temperature has reached approximately 380° C. The weak distillate, of which the third fraction consists, may be concentrated to 93% by the ordinary methods. The process according to my invention can now be repeated with practically no loss of phosphoric acid. The phosphoric acid remaining in the still is at a proper degree of concentration for the introduction of the next batch of 93% $H_2SO_4$.

Since hot phosphoric acid has a decided corrosive effect on the usual apparatus materials, it is important that acid-resistant materials be employed. For this purpose the more resistant iron alloys may be used, as well as glass, chemical ware, apparatus of carbon or carbon alloys, or carborundum.

The processes described in the foregoing have many advantages, particularly in the fact that they allow the use of ordinary concentrated sulphuric acid for the production of fuming acid. In nitration processes as applied to explosive compounds, for example, certain organic compounds are nitrated with mixtures containing fuming sulphuric acid. During the course of the nitration, the sulphuric acid becomes diluted with the water resulting from the reaction. Up to the present time, no satisfactory method has been available for converting this weak acid into fuming sulphuric acid. It has been necessary, therefore, to dispose of weak acid to consumers who could make use of it in this dilution. Consequently, it has been necessary continually to produce a new supply of fuming acid by the contact sulphuric acid process. The present invention, however, makes possible the conversion of the weak acid directly into fuming sulphuric acid, which means great economic advantage to the process.

While the examples given in the foregoing, to illustrate more specifically how my new process may be carried out on a practical scale include the use of sulphuric acid of 93% or 96% strength, it is to be understood that my invention covers broadly the increase in strength of sulphuric acid including from a strength of less than 100% to a strength of over 100%. For practical purposes, however, less desirable results are contemplated in the production of fuming sulphuric when starting with acid of less than 80% strength. I intend to be limited in my invention only as indicated in the following patent claims:

I claim:
1. The process for the dehydration of concentrated sulphuric acid with phosphoric acid which process comprises: constantly maintaining in liquid form at all times, a body of phosphoric acid of varying degree of hydration, dehydrating the phosphoric acid to predominately pyro phosphoric, mixing therewith the concentrated sulphuric acid to be dehydrated and distilling the dehydrated sulphuric acid therefrom until the production of fuming sulphuric acid is substantially completed and collecting the same, continuing heating the body of phosphoric acid with separate collection of the distillate until the phosphoric acid is freed of sulphuric acid and dehydrated to predominately pyro phosphoric acid, and mixing with the same additional sulphuric acid to be dehydrated.

2. The process for the dehydration of concentrated sulphuric acid with phosphoric acid which process comprises: constantly maintaining in liquid form at all times, a body of phosphoric acid of varying degree of hydration, heating the same to approximately 520° C. to dehydrate the phosphoric acid to predominately pyro phosphoric, mixing therewith the concentrated sulphuric acid to be dehydrated and distilling the dehydrated sulphuric acid therefrom until the production of fuming sulphuric acid is substantially completed and collecting the same, heating the body of phosphoric acid to a maximum temperature of approximately 520° C. with separate collection of the distillate until the phosphoric acid is freed of sulphuric acid and dehydrated to predominately pyro phosphoric acid, and mixing with the same additional sulphuric acid to be dehydrated.

3. The process for the dehydration of concentrated sulphuric acid with phosphoric acid which process comprises: constantly maintaining in liquid form at all times, a body of phosphoric acid of varying degree of hydration, heating the same under pressure of approximately 15 mm. at a temperature of approximately 380° C. to dehydrate the phosphoric acid to predominately pyro phosphoric, mixing therewith the concentrated sulphuric acid to be dehydrated and distilling the dehydrated sulphuric acid therefrom at atmospheric pressure until a temperature of approximately 380° C. is reached and until the production of fuming sulphuric acid is substantially completed and collecting the same, reducing the pressure to approximately 15 mm. and heating the body of phosphoric acid with separate collection of the distillate until the temperature again reaches approximately 380° C. and the phosphoric acid is freed of sulphuric acid and dehydrated to predominately pyro phosphoric acid, and mixing with the same additional sulphuric acid to be dehydrated.

4. The process for the dehydration of sulphuric acid with phosphoric acid which process comprises: constantly maintaining in liquid form at all times, a body of phosphoric acid of varying degree of hydration, dehydrating the phosphoric acid to predominately pyro phosphoric, mixing therewith sulphuric acid of approximately 93–96% strength to be dehydrated and distilling the dehydrated sulphuric acid therefrom and collecting the sulphuric acid of approximately 104.5% strength, heating the body of phosphoric acid with separate collection of the distillate until a concentration of approximately 93% sulphuric acid is reached and dehydrating the phosphoric acid to predominately pyro phosphoric acid, and mixing with the same additional sulphuric acid of approximately 93–96% strength to be dehydrated.

MARSHALL F. ACKEN.